(12) United States Patent
Dillon

(10) Patent No.: US 7,051,772 B2
(45) Date of Patent: May 30, 2006

(54) FUEL FILLER WARNING INDICATOR

(76) Inventor: Richard J. Dillon, 38 Lakeside Ave., Lakeside, MT (US) 59922

( * ) Notice: Subject to any disclaimer, the term of this patent is extended or adjusted under 35 U.S.C. 154(b) by 0 days.

(21) Appl. No.: 10/884,599

(22) Filed: Jul. 2, 2004

(65) Prior Publication Data
US 2005/0000589 A1 Jan. 6, 2005

Related U.S. Application Data

(60) Provisional application No. 60/484,760, filed on Jul. 3, 2003.

(51) Int. Cl.
*B65B 1/04* (2006.01)

(52) U.S. Cl. .................. 141/97; 141/94; 220/254.3
(58) Field of Classification Search .. 220/254.3–254.9, 220/86.2; 141/94, 97
See application file for complete search history.

(56) References Cited

U.S. PATENT DOCUMENTS

| | | | | |
|---|---|---|---|---|
| 3,750,825 A | * | 8/1973 | Bachle | 220/324 |
| 3,930,388 A | * | 1/1976 | Barras | 70/159 |
| 3,998,354 A | * | 12/1976 | Song | 220/269 |
| 4,313,321 A | * | 2/1982 | Wasser | 70/159 |
| 4,638,919 A | * | 1/1987 | Feenick | 220/288 |
| 4,738,376 A | * | 4/1988 | Markus | 220/834 |
| 4,867,208 A | * | 9/1989 | Fitzgerald et al. | 141/18 |
| 4,998,989 A | | 3/1991 | Curiel | |
| 5,062,541 A | | 11/1991 | Galbo | |
| 5,240,759 A | | 8/1993 | Layton | |
| 5,327,946 A | * | 7/1994 | Perkins | 141/59 |
| 5,605,182 A | | 2/1997 | Oberrecht et al. | |
| 5,722,469 A | | 3/1998 | Tuminaro | |
| 5,730,292 A | | 3/1998 | Jones | |
| 5,971,042 A | | 10/1999 | Hartsell, Jr. | |
| 6,032,703 A | | 3/2000 | Baker et al. | |
| 6,522,947 B1 | | 2/2003 | Hartsell, Jr. | |
| 6,942,117 B1 | * | 9/2005 | Foltz | 220/86.2 |

* cited by examiner

*Primary Examiner*—Timothy L. Maust
(74) *Attorney, Agent, or Firm*—Greenebaum Doll & McDonald PLLC; Glenn D. Bellamy

(57) ABSTRACT

The present invention provides a fuel filler warning indicator for warning or reminding a user about to add fuel to a tank that only a particular type of fuel is to be used. It includes a flap portion or panel, which may include indicia, that is normally biased or disposed into a position that requires it to be manually displaced before the fuel filler cap can be removed or a fuel nozzle inserted.

2 Claims, 2 Drawing Sheets

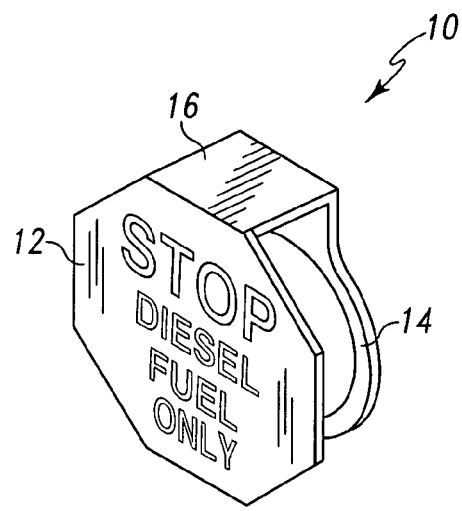
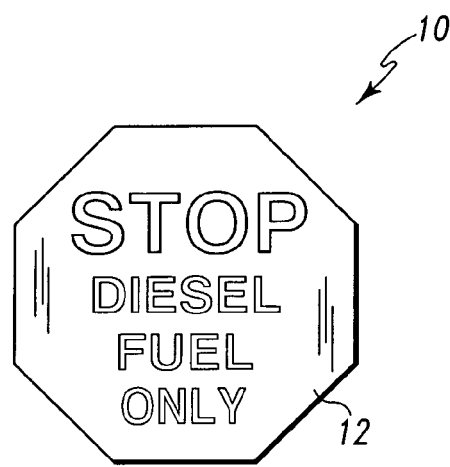
Fig. 1        Fig. 2
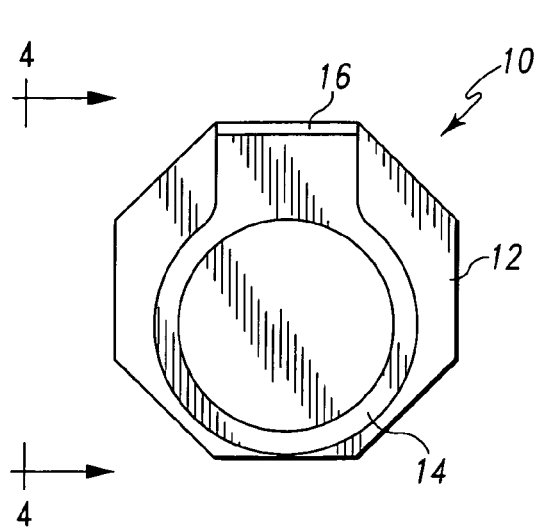
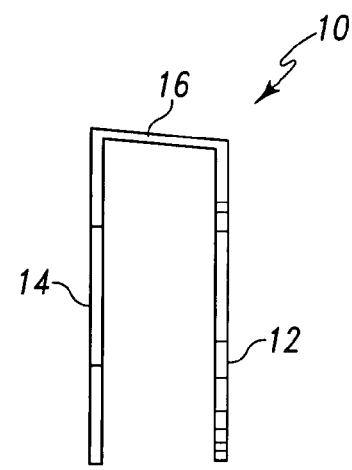
Fig. 3        Fig. 4

FUEL FILLER WARNING INDICATOR

CROSS REFERENCE TO RELATED APPLICATIONS

This application for patent claims the benefit of U.S. Provisional Application Ser. No. 60/484,760 of Richard J. Dillon, entitled "Fuel Filler Warning Indicator", filed Jul. 3, 2003 now abandoned.

FIELD OF THE INVENTION

The present invention relates generally to a visible warning indicator for use in conjunction with a fuel tank, and specifically to a removable or displaceable warning indicator covers or obstructs a fuel filler cap, such as on a motor vehicle, as a visible and tactile reminder to a user to fill the tank with a specified type of fuel, for example unleaded gasoline or diesel fuel.

BACKGROUND OF THE INVENTION

Unfortunately, it is an all too often occurrence for a driver of a vehicle powered by, for example, diesel fuel, to inadvertently or inattentively refuel the tank with ordinary unleaded gasoline. Although different-sized pump nozzles and filler tubes have been commercially introduced to prevent the introduction of leaded gasoline into a the fuel tank of a vehicle that is designated for unleaded fuel only, such a distinction does not exist for diesel fuel nozzles or filler tubes. This is largely a result of the need to pump somewhat larger volumes of diesel fuel into tanks for trucks, thereby resulting in larger diameter filler tubes fitted to diesel fuel tanks in order to permit quick refueling. These larger diameter tubes, unfortunately readily accommodate the common unleaded gasoline pump nozzle.

In some cases, a distinctive color has been used on fuel pump nozzles. However, with the myriad of colors in use to denote various grades of gasoline produced and distributed by various suppliers, and with no industry-wide standardization, this type of indicator is easily overlooked. Likewise, printed notations proximate to the fuel gauge and/or fuel filler neck stating "diesel fuel only" are easily ignored since nearly all passenger vehicles include a similar notation stating "unleaded fuel only", thereby leading to user inattentiveness.

Despite these prior attempts at providing the user with a warning not to introduce gasoline into a fuel tank of a diesel vehicle, this mistake continues to be a common occurrence. This is especially true for multi-car families in which one vehicle uses diesel fuel and one uses gasoline. Furthermore, this is also a persistent problem for the rental truck industry, wherein a person unfamiliar with a diesel-powered vehicle rents a truck and subsequently refuels with gasoline. Some renters mistakenly assume that all trucks are diesel while for others it never crosses their mind that not all vehicles use gasoline.

Consequently, when the improper fuel is introduced into a vehicle tank, the vehicle must be towed and the contaminated fuel drained from the tank. If it is not and the vehicle is started prior to noticing the error, the engine may be severely damaged. Either is a costly mistake.

Accordingly, there is a need for a fuel filler warning indicator that is readily and easily installed on vehicles or other machines employing fuel tanks to prevent the aforementioned costly error. Such a device would be particularly advantageous for use in rental truck fleets.

SUMMARY OF THE INVENTION

The present invention addresses the aforementioned problems by providing a flexible or hinged fuel filler warning cap indicator incorporating a flap that physically covers or intrudes over the fuel filler cap and/or neck such that the user must manually displace it or rotate it out of the way before introducing a fuel pump nozzle into the opening. The portion of the invention which intrudes on the filler cap may include written or symbolic indicia as a warning to remind the user of why they are required to remove this impediment prior to initiating the refueling process.

OBJECTS OF THE INVENTION

Therefore, one object of the invention is a fuel filler warning indicator that requires some operator interaction prior to the insertion of a fuel nozzle.

A further object of the present invention is a fuel filler warning indicator that is simple to install in turnkey applications.

A further object of the present invention is a fuel filler warning indicator that is readily produced by modern manufacturing techniques.

Further objects and advantages of the present invention will become apparent from the detailed description of the preferred embodiments of the invention below, taken in conjunction with the drawing Figures.

BRIEF DESCRIPTION OF THE DRAWING FIGURES

Like reference numerals are used to indicate like parts throughout the various figures of the drawings, wherein:

FIG. 1 is an isometric view in accordance with one embodiment of the present invention;

FIG. 2 is a front view in accordance with one embodiment of the present invention;

FIG. 3 is a back view in accordance with one embodiment of the present invention;

FIG. 4 is a view of the present invention taken along the line 4—4 of FIG. 3;

DETAILED DESCRIPTION OF THE PREFERRED EMBODIMENT(S)

Figure 5:
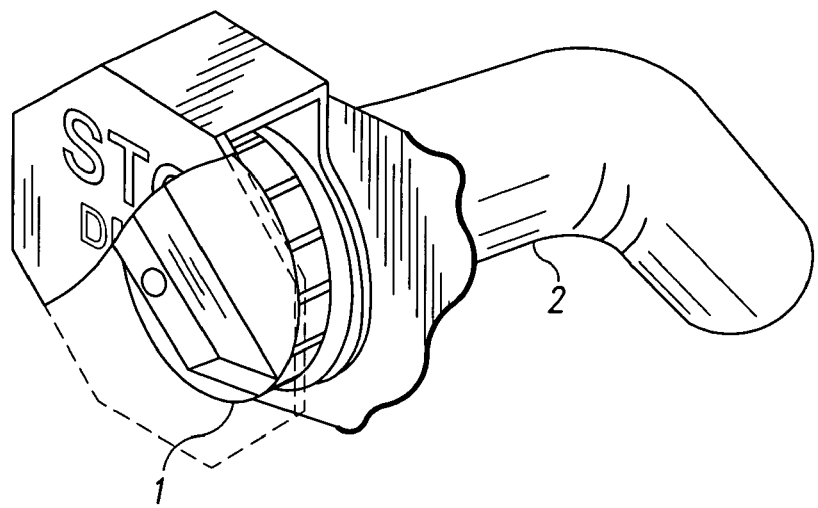
FIG. 5 is a partially cut away isometric view of the one embodiment of the present invention installed on a conventional fuel filler tube.

Referring now to the various figures of the drawing, and first to FIGS. 1–4, a fuel filler cap warning indicator 10 designed to be used in conjunction with a fuel tank is comprised of a warning flap 12 and a retention ring 14 interconnected by a hinge portion 16 that permits the warning flap 12 to be manually displaced or rotated about an axis proximate the hinge portion 16, thence returning itself to a detent position depicted in, for example, FIG. 5.

The warning flap 12 may be shaped in various configurations to attract the eye of the user. For example, as shown in the drawing Figures and octagonal warning flap 12 is used, similar to the shape of a conventional stop sign. In one embodiment of the present invention the entire warning indicator 10 may, for example, be molded by injection molding or equivalent manufacturing technique as a single unit of flexible "rubber-like" solvent-resistant material. This embodiment of the invention confers the distinct advantages of a unitary design and concomitant economy of manufacture.

The generally circular retention ring 14 may be shaped to stretch over the mouth of a fuel filler tube 2, as shown in FIG. 5. In one embodiment of the present invention, the retention ring is sized slightly smaller than the mouth of the filler tube 2, such that it must be slightly stretched to be placed over the mouth and onto the tube 2. Alternatively, an extension of the hinge portion 16 may be attached, such as by adhesive or screws (not shown), to some part of the vehicle (or machine) adjacent the filler tube 2 in a manner that would allow the warning flap 12 to normally fall over, in front of, or in interference with removal of the fuel filler cap 1. Furthermore, in another embodiment of present invention, the retention ring 14 may be shaped to be only a partial ring, so that it may be readily clipped or slid on to a fuel filler tube 2.

The warning flap 12 may further include appropriate visible indicia, such as that shown in FIGS. 1 and 2, to remind the user why they are being presented with an obstacle to inattentive removal of the fuel filler cap and insertion of a pump nozzle. The indicia on the warning flap 12 may also include raised letters, to further provide a user with a tactile warning. Additionally, the entire device 10, or at least the warning flap 12, may be brightly colored so as to provide a visual indicator as well.

Figure 6:
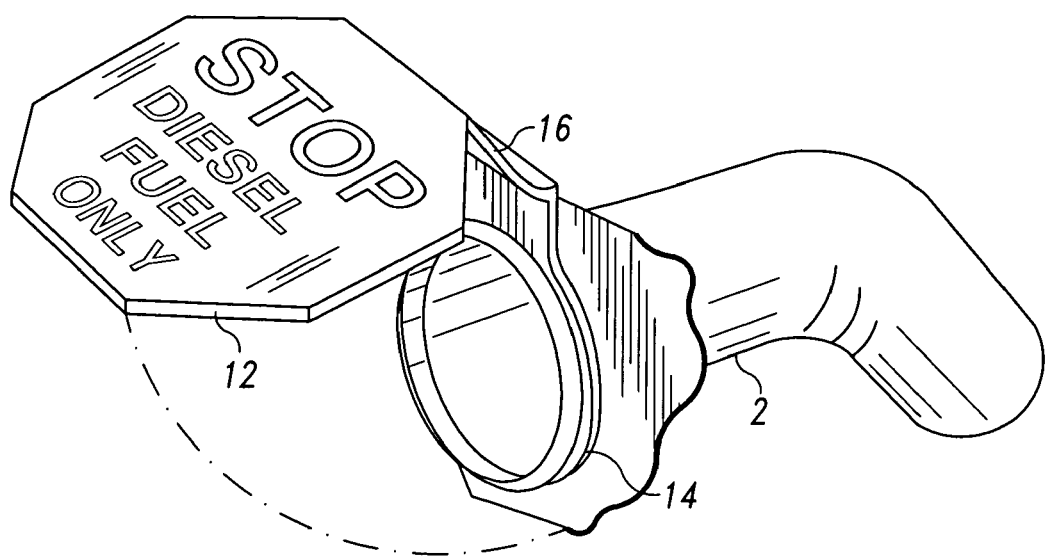
FIG. 6 is an isometric view of the invention depicting the warning flap displaced away from the filler cap and tube, and the filler cap removed for introduction of the fuel nozzle.

The hinge portion 16 may be sufficiently flexible and elastic to permit simple bending displacement of the warning flap 12 out of the way, yet permit the flap 12 to repeatedly return to its detent position after the fuelling procedure is complete. Alternatively, the hinge portion 16 may include one or more integral or conventional hinges to facilitate the same. In any event, the design or installed orientation of the device 10 is such that the warning flap 12 will be biased, either by spring force or gravity, into a position in interference with the fuel filler cap 1 or fill spout 2, as best seen in FIGS. 5 and 6.

The foregoing detailed description of the preferred embodiments of the invention is considered as illustrative only of the principles of the invention. Since the instant invention is susceptible of numerous changes and modifications by those of ordinary skill in the art, the invention is not limited to the exact construction and operation shown and described, and accordingly, all such suitable changes or modifications in structure or operation which may be resorted to are intended to fall within the scope of the claimed invention.

I claim:

1. A warning indicator for use with a fuel tank having a fuel filler cap, comprising:

a warning flap for at least partially covering said fuel filler cap, moveable separately from said filler cap and positioned such that the flap must be displaced for access to said fuel filler cap;

a retention ring for securing said indicator to a vehicle; and a hinge portion connecting said warning flap and said retention ring, wherein said warning flap is biased toward said fuel filler cap by said hinge portion, thereby requiring displacement of said warning flap for access to said fuel filler cap.

2. A warning indicator for use with a fuel tank having a fuel filler cap, comprising:

a warning flap for at least partially covering said fuel filler cap, moveable separately from said filler cap and positioned such that the flap must be displaced for access to said fuel filler cap;

a retention clip for securing said indicator to a vehicle; and a hinge portion connecting said warning flap and said retention clip, wherein said warning flap is biased toward said fuel filler cap by said hinge portion, thereby requiring displacement of said warning flap for access to said fuel filler cap.

* * * * *